United States Patent [19]

Yoshida et al.

[11] 4,437,129

[45] Mar. 13, 1984

[54] MAGNETIC RECORDING AND REPRODUCING APPARATUS ENABLING TAPE TRANSPORT IN THE FORWARD AND REVERSE DIRECTIONS

[75] Inventors: Masashi Yoshida, Ibaraki; Hajime Yokota, Katsuta; Mitsuji Aman, Mito; Tatsuya Shigemura, Katsuta, all of Japan

[73] Assignee: Hitachi, Ltd., Tokyo, Japan

[21] Appl. No.: 281,400

[22] Filed: Jul. 8, 1981

[30] Foreign Application Priority Data

Jul. 9, 1980 [JP] Japan .................................. 55-92780

[51] Int. Cl.³ ............................................ G11B 15/66
[52] U.S. Cl. ...................................... 360/85; 360/95; 360/96.4
[58] Field of Search .......... 360/85, 95, 96.1, 96.3–96.4

[56] References Cited

U.S. PATENT DOCUMENTS

3,969,766 7/1976 Tanaka et al. ...................... 360/85
4,121,267 10/1978 Hayashi ........................... 360/95 X

*Primary Examiner*—John H. Wolff
*Attorney, Agent, or Firm*—Antonelli, Terry & Wands

[57] ABSTRACT

A magnetic recording and reproducing apparatus having a single electromagnet for driving an idler mechanism for driving a take-up reel mount in a forward playback operation, a brake mechanism for a supply reel in a forward playback operation and a brake mechanism for the take-up reel mount. A high speed capstan-driven tape transport in both forward and reverse directions is attained by a simple construction.

4 Claims, 12 Drawing Figures

FIG. 1

→ FORWARD
→ REVERSE

FIG.12

MAGNETIC RECORDING AND REPRODUCING APPARATUS ENABLING TAPE TRANSPORT IN THE FORWARD AND REVERSE DIRECTIONS

BACKGROUND OF THE INVENTION

The present invention relates to a magnetic recording and reproducing apparatus such as a video tape recorder which permits high speed transport of a magnetic tape bidirectionally in forward and reverse directions.

Whenever a magnetic tape is loaded or unloaded the tape position is shifted a little bit so that the tape may slacken or jump in the recording or playback operation. In the past, in order to prevent such phenomenon, a break force is applied to a take-up reel mount in the loading or unloading period and the tape is unwound in the loading operation or wound in the unloading operation by a supply reel mount. On the other hand, a recent trend of a video tape recorder (VTR) requires high speed tape transport in a reverse direction such as reverse playback or review. In such a case, if the tape unwound from the reel mount is driven by the pinch by a pinch roller and a capstan, the tape may be unwound too much or too little at the capstan position unless a predetermined amount of brake force is imparted to the supply reel mount and as a result the tape may be damaged. Accordingly, it is essential to apply the brake force to the supply reel mount in the reverse tape transport, that is, the take-up reel in the forward tape transport. In the past, in order to impart the brake force to the take-up reel mount (in the forward tape transport) in the reverse tape transport operation as well as in the tape loading and unloading operations, a clutch mechanism has been used. In a remote control equipment, a specially designed electromagnet has been used as a power source for driving the clutch.

On the other hand, a tape take-up mechanism at a reel shaft in the forward tape transport usually uses engagement and disengagement of an idler through a friction torque limiter mechanism. When it is desired to transport the tape in the reverse direction in such an equipment, it is essential to release the transmission drive of the idler mechanism to disable it because the tape would otherwise be transported excessively since the tape drive speed at the reel mount is higher than the tape drive speed at the capstan. In the past, in order to transport the tape in the reverse direction in this type of mechanism, a special electromagnet has been provided to release the idler. A braking mechanism for the supply reel mount in the forward tape transport usually comprises a conventional tension servo mechanism which includes a combination of an arm having a tension pin and a band brake. In such a system, however, the brake force acts as a load to the take-up reel in the reverse tape transport, and in a high speed reverse tape transport the arm having the tension pin hunts to create variation in the tape tension in the tape path, resulting in the disturbance in a playback image. Accordingly, it is desirable to retract the tension pin away from the tape path. For this reason, in the past, the exclusive electromagnets actuated in the reverse tape transport have been used. As a result, the equipment has been very expensive.

A magnetic recording and reproducing apparatus in which the take-up and supply reel mounts are independently and directly driver by respective motors has been known. In this type of apparatus, a tension servo mechanism including a light source and a light sensor instead of the band brake is used. The brake forces to the reel mounts are applied by applying back voltages to the respective motors. Since such apparatus uses a plurality of motors and complex control, the apparatus is expensive.

SUMMARY OF THE INVENTION

It is an object of the present invention to provide a magnetic recording and reproducing apparatus which enables high speed tape transport by capstan drive bidirectionally in forward and backward directions.

It is another object of the present invention to provide a magnetic recording and reproducing apparatus which is simple in construction and hence inexpensive and economic.

In accordance with one feature of the present invention, an idler mechanism used to drive the take-up reel mount in the forward playback operation, a first brake mechanism for the supply reel mount in the forward playback operation and a second brake mechanism for the take-up reel mount are driven by a single electromagnet such that in the forward tape transport the electromagnet assumes a first attracted or non-attracted position to permit the actuation of the idler and the first brake mechanism for the supply reel mount and release the second brake mechanism for the take-up reel mount and in the reverse tape transport and the tape loading and unloading operations the electromagnet assumes a second non-attracted or attracted position to release the idler and the first brake mechanism and permit the actuation of the second brake mechanism.

DESCRIPTION OF THE PREFERRED EMBODIMENTS

The preferred embodiments of the present invention will now be described with reference to the accompanying drawings.

Figure 1:
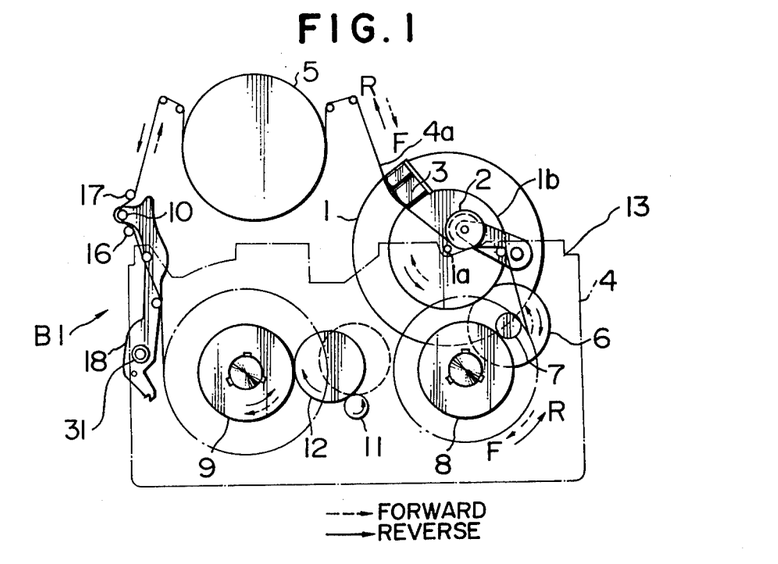
FIG. 1 shows a schematic plan view of one embodiment of a magnetic recording and reproducing apparatus of the present invention.

FIG. 1 shows a schematic diagram of an entire apparatus, in which numeral 1 denotes a capstan motor, 1a denotes a capstan at a center axis thereof, 2 denotes a pinch roller, 3 denotes an audio and control signal head, 4 denotes a cassette half, 4a denotes a magnetic tape wound on a pair of reels mounted in the cassette half 4, 5 denotes a rotary head cylinder, 6 denotes a take-up idler, 7 denotes a take-up roll integral with the take-up idler 6, 8 denotes a take-up reel mount, 9 denotes a supply reel mount, 10 denotes a tension pin, 11 denotes a reel motor pulley, 12 denotes a FR idler, 13 denotes a chassis, 16 denotes a stationary guide, 17 denotes a tape guide and 18 denotes a tension arm which supports the tension pin 10.

The capstan 1a is an output shaft of the direct-driver capstan motor 1 and rotatably mounted on the chassis 13. The take-up idler 6 and the take-up roll 7 which is coaxial thereto and rotates therewith are detachably mounted between a flywheel 1b of the capstan motor 1 and the take-up reel mount 8. Provided between the take-up idler 6 and the take-up roll 7 is a conventional friction torque limiter which is known per se and is not shown. The FR idler 12 for transmitting rewind and fast forward forces is pressed to the motor pulley 11 fixed to the shaft of the reel motor 14, between the supply reel mount 9 and the take-up reel mount 8 such that the FR idler 12 pivots along the motor pulley 11 to abut against the reel mount 8 or 9.

Figure 2:
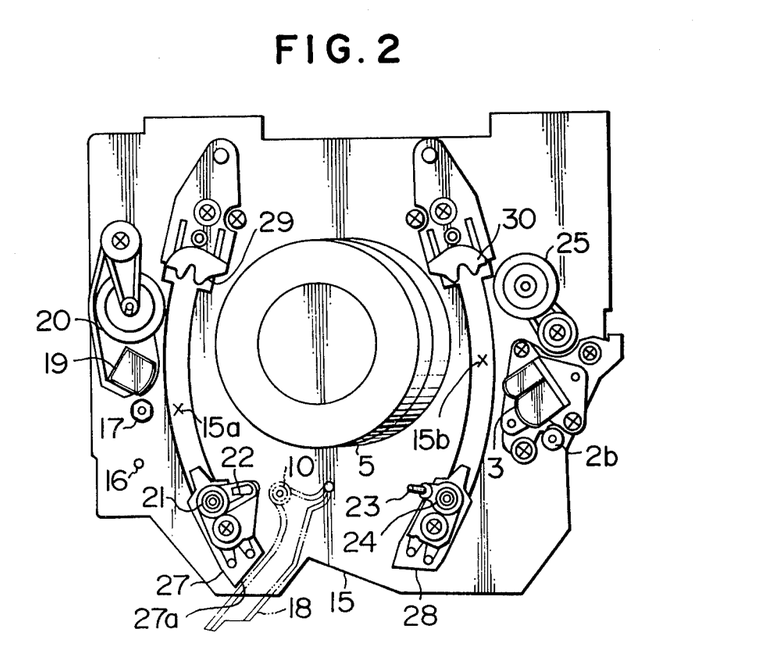
FIG. 2 shows a schematic plan view illustrating a construction of a tape loading system in the embodiment of FIG. 1.

The construction of the tape path is now explained. FIG. 2 shows a plan view illustrating the sub-chassis 15 and the parts and the mechanisms arranged thereon. As shown in FIGS. 1 and 2, the tape 4a unwound from the supply reel in the cassette 4 first passes through the stationary guide 16 mounted on the sub-chassis 15 and the tape guide 17 which is vertically finely adjustable. In the playback and record modes, the pin 10 of the tension arm 18 is present between those guides 16 and 17 and it contacts to the tape to automatically adjust the backtension torque of the supply reel mount 9 in accordance with the tape tension. Following to the tape guide 17, the tape passes through an entire width erase head 19 and a vertically finely adjustable input guide roll 21 and then it is wrapped around an input slant pin 22 which is finely adjustable in its direction of rotation around the guide roll 21, and then wrapped around the cylinder 5 which contains the rotary head therein which is mounted obliquely to the chassis 13 and driven by a direct-driven motor, and then it is wrapped around an output guide roll 24 at which the tape deflects to the cassette. The tape is then wrapped around an impedance roll 25, passes through the audio and control signal head 3 and contacts to a vertically finely adjustable tape guide 2b and the tape is pinched by the capstan 1a and the pinch roller 2 so that it is driven at a constant speed. The tape finally reaches the take-up reel of the cassette half 4. As shown in FIG. 2, the guide rolls 21 and 24 and the slant pins 22 and 23 are mounted on the guide roll bases 27 and 28, respectively. The guide roll bases 27 and 28 are guided by arcuate grooves 15a and 15b formed in the sub-chassis 15 so that in the stop position they are positioned at the start ends of the arcuate grooves 15a and 15b shown in FIG. 2 and in the record and playback positions in which the tape has been loaded, they reach the rear ends at which the guide rolls 21 and 24 and the slant pins 22 and 23 are positioned by engagement members 29 and 30.

Figure 5:
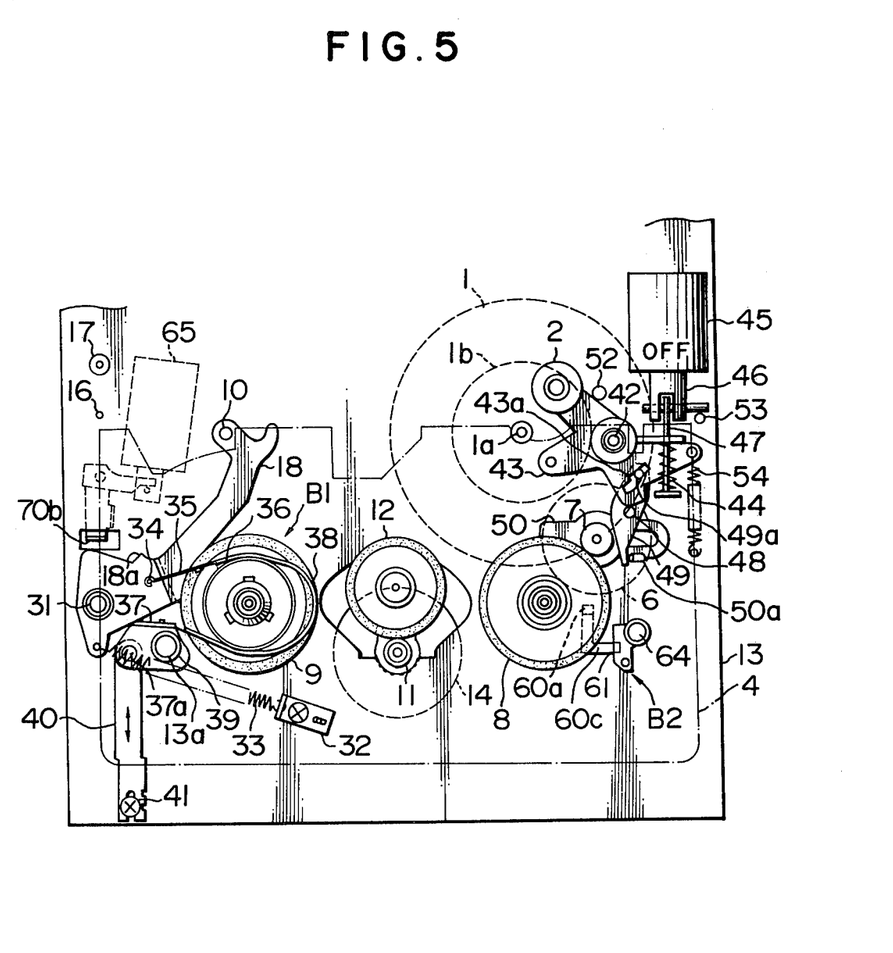
FIG. 5 shows a plan view in a stop mode of the embodiment of FIG. 1.

A construction of first brake means B1 for imparting the back tension to the tape, that is, the tension arm 18 is now explained. Referring to FIG. 5, the tension arm 18 is pivotable around a shaft 31 on the chassis 13 and biased counterclockwise as viewed in FIG. 5 by a tension spring 33 having the other end thereof hooked to an L-shaped member 32 which is adjustably mounted on the chassis 13. In the position other than the record and playback positions, the tension arm 18 is pressed and held in position by an end 27a of the guide roll base 27 which is positioned at the start end of the arcuate groove 15a of the sub-chassis 15 as shown in FIG. 2. A pin 34 is studed at the center of the tension arm 18 and one end of a brake arm 35 is pivotably mounted at the center of the pin 34. A band brake 36 is fixed to the other end of the brake arm 35 and the other end of the band brake 36 is fixed to an L-shaped band holder 37. A brake shoe 38 is mounted to the band brake 36 and it is wrapped around the outer circumference of the reel mount 9 over an angle of approximately 180 degrees. The band holder 37 has a circular hole at the center of its surface parallel to the chassis 13 and pivotably mounted around a guide boss 13a of the chassis 13 and held by a stop ring 39 with a minimum vertical play. The band holder 37 has a shaft 37a which is studded at a portion remote from the pivot center 13a of the chassis 13 and which is pivotably coupled to a hole of an adjusting plate 40. The adjusting plate 40 extends outward of the chassis and is slidably mounted on the chassis in the direction of an arrow. It is fixed to the chassis 13 by a screw 41 to permit the movement and setting of the adjusting plate 40 even when the cassette 4 is loaded.

A construction of pinch roller pressing means is now explained. The loading operation of unwinding the magnetic tape 4a from the cassette 4 by the guide rolls 21 and 24 and the slant pins 22 and 23 and moving the guide roll bases 27 and 28 to wrap the tape around the cylinder 5 over a predetermined angle and the unloading operation of returning the magnetic tape into the cassette are not illustrated but they are carried out by conventional driving power sources such as exclusive motors.

Figure 6:
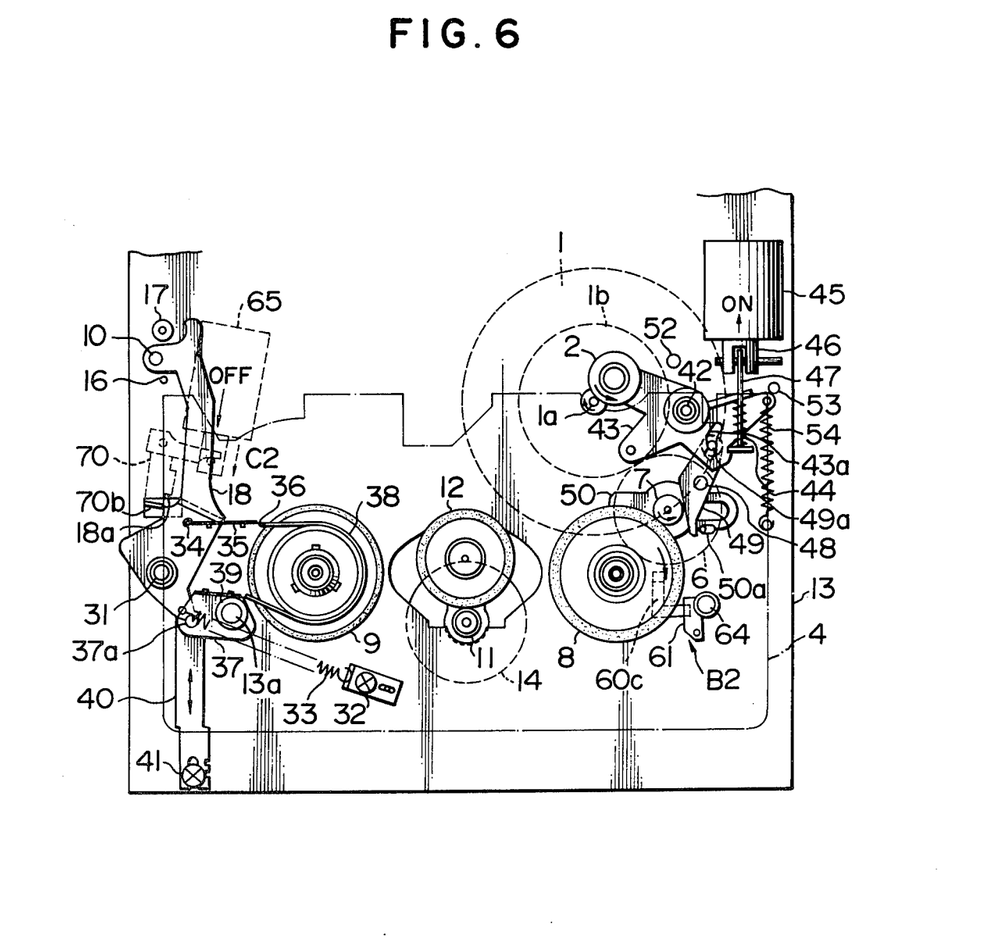
FIG. 6 shows a plan view in a forward tape transport of the embodiment of FIG. 1.
Figure 7:
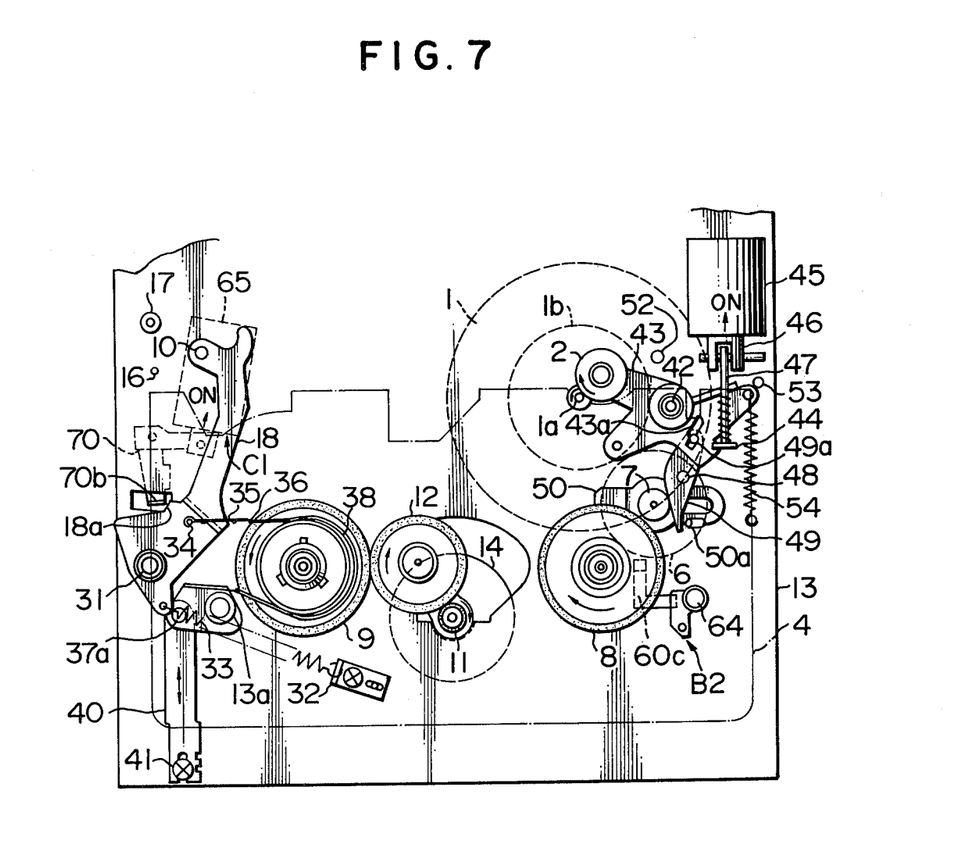
FIG. 7 shows a plan view in a reverse tape transport of the embodiment of FIG. 1.

Referring to FIGS. 5 through 7, the pinch roller 2 is rotatably supported by a shaft mounted on a pinch roller arm 43 which is pivotable around a pin 42 on the chassis 13. One end of the pinch roller arm 43 is linked through a compression spring 44 to a rod 47 which is coupled to a plunger 46 of an electromagnet 45, which is actuated in response to an electric signal generated upon the completion of the loading operation by the loading mechanism and released by a start signal for the unloading operation. When it is released, the pinch roller arm 43 is restricted by a stopper 52 on the chassis and a return tension spring 54 while the plunger 46 is restricted by a stopper 53. A pin 49a of an arm 49 which is pivotable around a fixed shaft 48 on the chassis 13 engages with a cam hole 43a formed in the pinch roller arm 43. The other end of the arm 49 abuts against a pin 50a of a take-up arm 50 to prevent the take-up arm 50 from sliding leftward as viewed in FIG. 5. The leftward biasing force of the take-up arm 50 is generated by a torsion spring 51 (FIG. 8) supported by the chassis 13.

The take-up idler 6 and the take-up roll 7 are rotatably and coaxially supported by the take-up arm 50 so that when the take-up arm 50 slides leftward they are pressed to a flywheel 1b of the capstan motor 1 and an outer circumference of the take-up reel mount 8, respectively. This takes place when the arm 49 pivots clockwise (in FIG. 6), that is, when the pinch roller 2 contacts to the capstan 1a or when the pinch roller arm 43 pivots counterclockwise by the attraction of the electromagnet 45 after the loading operation so that the cam hole 43a no longer captures the pin 49a of the arm 49.

As the loading operation terminates through the sequences described above, the pinch roller 2 contacts to the capstan 1a while the take-up roll 7 and the take-up idler 6 contact to the flywheel 1b of the capstan motor 1 and the take-up reel mount 8, respectively.

Figures 3, 4:
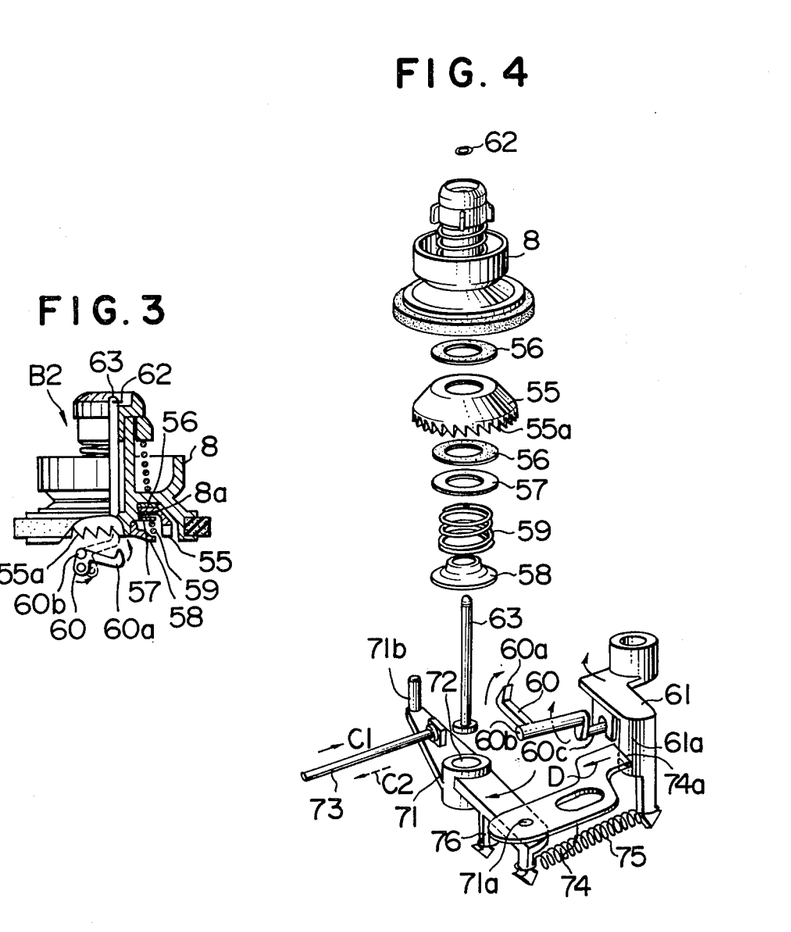
FIG. 3 shows a fragmentary sectional view of a take-up reel mount in the embodiment of FIG. 1.
FIG. 4 shows a broken view of the take-up reel mount shown in FIG. 3 and a perspective view of a brake mechanism.
Figure 8:
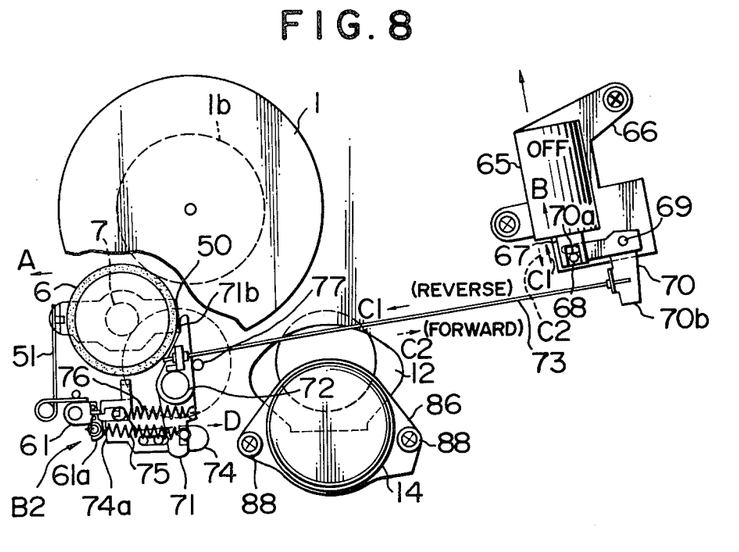
FIG. 8 shows a rear view of the mechanisms shown in FIGS. 5 to 7.

A construction of second brake means B2 on the take-up reel mount 8 is now explained. A clutch unit mounted on the take-up reel mount 8 is first explained with reference to FIGS. 3 and 4. A clutch 55 having a ratchet 55a on a thrust plane is loosely and rotatably fitted to a shaft 8a of the take-up reel mount 8 and it is held between a felt 56 attached on the surface facing the take-up reel mount 8 and a felt 56 attached on the surface facing a spring receptacle 57. The spring receptacle 57 is loosely fitted to the shaft 8a and vertically movable and has guides (not shown) to prevent mutual rotation. A compression spring 59 is mounted between a stopper 58 fixed at the lower end of the shaft 8a and the spring receptacle 57 and its spring force serves to press the felt 56 to the clutch 55 and a predetermined amount of friction torque is imparted between the take-up reel mount 8 and the clutch 55. In FIG. 4, numeral 63 denotes a reel shaft on the chassis and numeral 62 denotes a stop ring fixed to the reel shaft 63 to prevent upward movement of the take-up reel mount 8. A pawl 60a of the clutch lever 60 opposes to the ratchet of the clutch 55. The clutch lever 60 has its shaft 60b pivotably supported by the chassis. A pin 60c of the clutch lever 60 is linked to a conversion arm 61 (FIG. 4). The conversion arm 61 is pivoted around a shaft 64 of the chassis 13 in FIG. 5 and forms a boss 61a which partially extends below the chassis (FIGS. 3 and 8). In FIG. 8, numeral 65 denotes an electromagnet in an off position which is mounted on the chassis 13 by a bracket 66. A rod pin 68 of a plunger 67 abuts against an arm 70a of a release arm 70 which is pivotable around a shaft 69 on the bracket 66 such that when the plunger 67 is attracted the release arm 70 pivots counterclockwise around the shaft 69. Numeral 71 denotes another release arm which is pivotable around a shaft 72 on the chassis 13 and linked to the release arm 70 by a rod 73 which is loosely fitted to the respective arms. In FIG. 3, a pin 71a of the release arm 71 is loosely fitted to a hole formed in a slider 74 which is slidable on the chassis in the direction of an arrow. An end 74a of the slider 74 abuts against the boss 61a of the conversion arm 61. On the other hand, a tension spring 75 spans between the conversion arm 61 and the release arm 71 and a tension spring 76 spans between the release arm 71 and the chassis 13. Numeral 77 denotes a stopper for limiting the clockwise pivotal movement of the release arm 71. An end 71b of the release arm 71 is permitted to abut against the take-up arm 50. When the electromagnet 65 in FIG. 8 is energized the rod 73 moves in the direction of C1 so that the release arm 71 pivots counterclockwise around the shaft 72 to displace to take-up arm 50 in the direction of an arrow A in FIG. 8. An arm 70b of the release arm 70 which extends above the chassis 13 is permitted to abut against 18a of the tension arm 18. When the release arm 70 pivots clockwise around the shaft 69 in FIG. 8, the arm 70b causes the tension arm 18 to pivot clockwise around the shaft 31 in FIG. 6.

Figure 9:
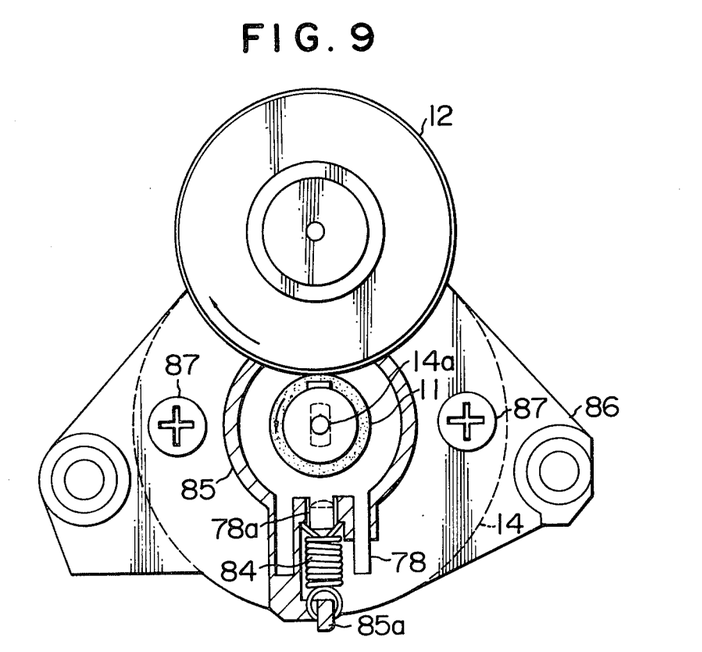
FIG. 9 shows a plan view illustrating a transmission mechanism from a reel motor to a FR idler in the embodiment shown in FIG. 1.
Figures 10, 11:
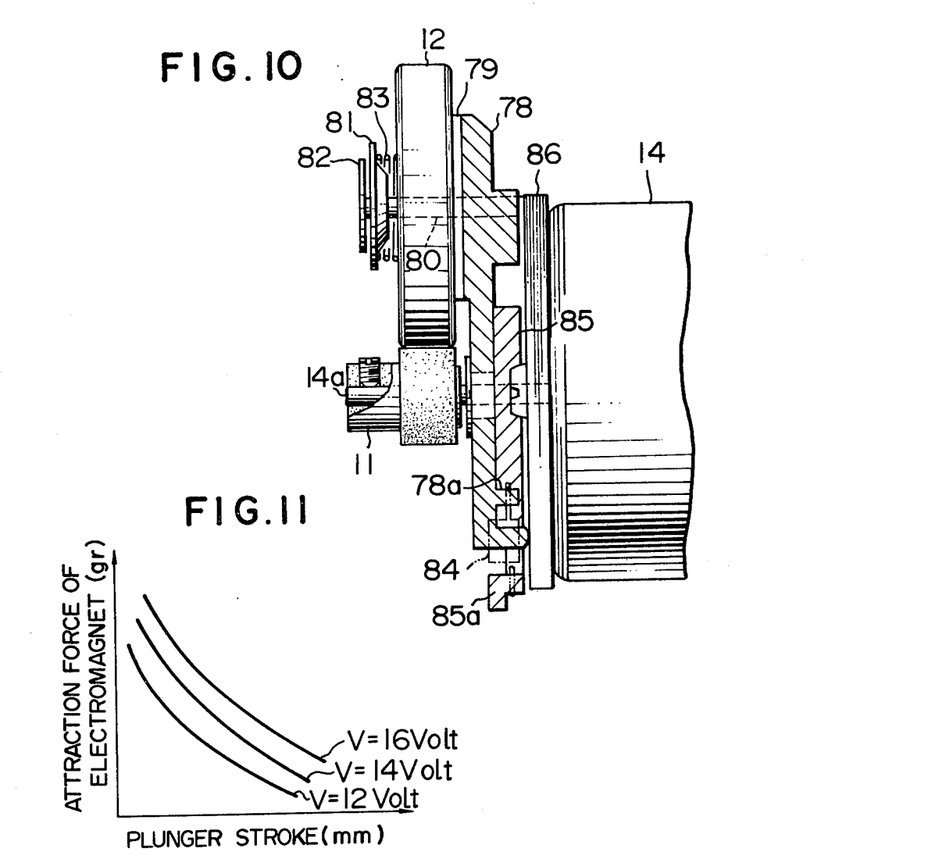
FIG. 10 shows a side elevational view, partly broken, of the mechanism of FIG. 9.
FIG. 11 shows a graph illustrating a relationship between an attraction force of an electromagnet and a plunger stroke.

A construction of an FR idler mechanism which drives the take-up reel and the supply reel is now explained. Referring to FIGS. 9 and 10, a felt 79 is bonded to a pivot lever 78 which rotatably supports the FR idler 12. A shaft 80 (FIG. 10) extends to both sides of the felt 79. The FR idler 12 is rotatably and loosely fitted to the shaft 80 at the bottom thereof, a spring receptacle 81 is loosely fitted to the shaft 80 at an intermediate portion thereof and a stopper 82 is tightly fitted to the shaft 80 at the top thereof. A compression spring 83 is mounted between the FR idler 12 and the spring receptacle 81 and a tension spring 84 is hooked to the other end 78a of the pivot lever 78 which presses the FR idler 12 to the felt 79. The end 78a is loosely fitted to a groove of a lever 85 (hatched portion) and guided thereby. The pivot lever 78 is loosely fitted to a rotary shaft 14a of the reel motor 14 and has a slot which extends by a predetermined length in the longitudinal direction of the lever to permit slidal movement. It is pivotable around the rotary shaft 14a. On the other hand, the lever 85 has a circular hole which is loosely fitted to the rotary shaft 14a and it is pivotable around the shaft 14. Since the other end 78a of the pivot lever 78 is loosely fitted to a groove of the lever 85, the lever 85 and the pivot lever 78 can pivot integrally and slide relative to each other in the longitudinal direction. Since one end of the tension spring 84 is hooked to one end of the lever 85, the FR idler 12 on the pivot lever 78 is pressed to the motor pulley 11 fixed to the rotary shaft 14a of the reel motor 14, by the force of the tension spring 84. The reel motor 14 is fixed to a motor support 86 by screws 87 and the motor support 86 is fixed to the chassis 13 by screws 88 (FIG. 8).

When the reel motor 14 starts to rotate counterclockwise from the position shown in FIG. 9, the FR idler 12 which is pressed to the motor pulley 11 does not rotate because of the friction by the felt 79 to which the FR idler is pressed. As a result, the motor pulley 11, the FR idler 12, the pivot lever 78 and the lever 85 pivot in union counterclockwise around the rotary shaft 14a so that the FR idler 12 presses the supply reel 9 shown in FIG. 7. As it presses strongly enough to disable further pivotal movement of the pivot lever 78, the FR idler 12 overcomes the frictional resistance of the felt 79 and start to rotate clockwise so that it drives the supply reel mount counterclockwise. Similarly, when the reel motor 14 rotates clockwise in FIG. 9, the pivot lever 78 pivot clockwise so that the FR idler 12 contacts to the take-up reel mount 8 to drive it clockwise.

The operations in the respective modes when corresponding buttons are depressed in the constructions described above are now explained.

(a) Forward Tape Transport

When a playback or record button is depressed in the record and playback position or stop position, the conventional loading mechanism starts to operate so that the guide roll bases 27 and 28 start to move along the arcuate grooves 15a and 15b of the sub-chassis. The guide rolls 21 and 24 and the slant pins 22 and 23 pull out the magnetic tape 4a from the cassette, and as the loading operation starts the electromagnet 65 is actuated. Thus the plunger 67 moves in the direction of an arrow B in FIG. 8 so that the release arm 70 pivots clockwise around the shaft 69 in FIG. 8, and the arm 70b shown in FIG. 7 restricts the counterclockwise pivotal movement around the shaft 31 of the tension arm to a predetermined range. On the other hand, as the release arm 70 pivots, the rod 73 is pushed in the direction of an arrow C so that the release arm 71 pivots around the shaft 72 against the force of the tension spring 76 counterclockwise in FIG. 8 or clockwise in FIG. 3. As the slider 74 is slid in the direction of an arrow D, the conversion arm 61 pivots clockwise around the shaft in FIG. 3 to actuate the clutch lever 60 so that the pawl 60a of the clutch lever 60 is switched to an engaging position to the ratchet 55a of the clutch 55. If it happens that the pawl 60a rides on the tip end of the ratchet 55a of the clutch 55 to prevent complete engagement, the boss 61a of the conversion arm 61 is little displaced from the slider 74a when the slider 74 displaces in the direction of an arrow D because the pivotal movements of the clutch lever 60 and the conversion arm 61 are stopped and the tension spring 75 is tensioned. However, if the take-up reel mount 8 is rotated by even a small angle by the magnetic tape 4a, the ride of the pawl 60a of the clutch lever 60 on the tip end of the clutch 55 is taken away because the clockwise pivoting force as viewed in FIG. 4 is always imported to the conversion arm 61 by the biasing force of the tension spring 75 and the pawl 60a is perfectly engaged with the ratchet 55a. Since the clutch 55 is in the stopped position at this time while the take-up reel mount 8 is rotating, the take-up reel mount 8 is imported with a braking load torque by the friction of the felt 56 which is pressed to the clutch 55. Accordingly, in the loading operation of the magnetic tape 4a, the tape is continuously pulled out of the supply reel mount 9. As the guide roll bases 27 and 28 are positioned by the engagement members 29 and 30 and the magnetic tape 4a establishes a predetermined tape path, an end of loading detection switch (not shown) is actuated to release the attraction of the plunger 67 of the electromagnet 65 so that the release arm 70 returns counterclockwise as viewed in FIG. 8 by the biasing force of the tension spring 76 and the restriction to the counterclockwise pivotal movement of the tension arm 18 as viewed in FIG. 7 is released. As a result, the tension arm 18 pivots to a predetermined position by the biasing force of the tension spring 33 and the tension pin 10 wraps around the magnetic tape 4a over a predetermined angle (FIG. 6). Since the band brake 36 wraps around the outer circumference of the supply reel mount 9 over approximately 180 degrees, a backtension necessary to record/playback operation is imparted by the friction force with the brake shoe and the tension pin 10 mechanically controls the braking force. The band holder 37 and the adjusting plate 40 serve to adjust a reference position of the tension pin 10. By moving the adjusting plate 40 in the direction of the arrow, the band holder 37 is pivoted around the guide hole 13a of the chassis 13 to adjust the amount of pivotal movement of the tension arm 18 or the position of the tension pin 10 in the record/playback mode. In this manner the fine adjustment is carried out while the tape is running. Upon the release of the electromagnet 65, the electromagnet 45 is actuated (FIG. 6) so that the pinch roller arm 43 pivots counterclockwise around the shaft 42 to finally pinch the magnet tape 4a with the capstan 1a to drive the magnetic tape at a constant speed. The pressing force of the pinch roller 2 to the capstan 1a is determined by the force of the compression spring 44 mounted on the rod 47 which is coupled to the plunger 46. By the pivotal movement of the pinch roller arm 43 the arm 49 pivots clockwise around the shaft 48 by the engagement of the cam hole 43a and the pin 49a. Accordingly, the take-up arm 50 starts to slide leftward as viewed in FIG. 6 by the biasing force of the return spring 51 and the take-up roll 7 finally contacts to the take-up reel mount 8 and the take-up idler 6 contacts to the flywheel 1b of the capstan motor 1 so that the drive force of the capstan motor 1 is transmitted to the take-up reel mount 8 through the torque limiter mechanism by the friction of the take-up idler 6 to take-up the tape driven by the pinch roller 2 and the capstan 1a. In this manner, the tape is transported forward.

(b) Reverse tape transport.

FIG. 6 shows a plan view illustrating the forward tape transport while FIG. 7 shows a plan view illustrating the reverse tape transport. While the forward tape transport has been described in section (a), the section (b) describes the reverse tape transport for reverse playback (including fast reverse playback) and a merging recording in which the magnetic tape is moved reversely by a predetermined amount each time a video signal is recorded and a rotation speed of the capstan motor is changed for a time period corresponding to a phase difference between a period signal on the reversely moved tape portion and a newly recorded period signal to adjust the phase of two signals, and then the recording of the video signal is resumed so that the video signal is recorded without disturbance in the track at the merging area.

When the reverse tape transport operation is carried out in the playback or record mode (a), the capstan motor 1 is driven reversely so that the reel motor 14 is driven counterclockwise as viewed in FIG. 7. As a result, the magnetic tape 4a is driven reversely by the pinch roller 2 and the capstan 1a and the reel motor 14 rotates counterclockwise to swing the FR idler 12 into contact with the supply reel mount 9 to drive it. As a result the tape driven by the capstan is taken up by the supply reel. Simultaneously with the drive of the motor, the electromagnet 65 is actuated. Thus, like in the tape loading operation, the tension arm 18 is pivoted clockwise as viewed in FIG. 7 and the tension pin 10 is retracted from the tape travel path to brake the contact with the magnetic tape 4a. As the electromagnet 65 is actuated, the pin 71a of the release arm 71 pushes the take-up arm 50 in the direction of the arrow A in FIG. 8 so that the take-up roll 7 and the take-up idler 6 are released from the contacts to the take-up reel mount 8 and the capstan frywheel 1b, respectively, and a braking force is imparted to the take-up reel mount 8 by the engagement of the clutch 55 and the clutch lever 60. By releasing the contact of the take-up idler 6 during the reverse rotation of the capstan motor 1, the slack of the tape which would otherwise be necessarily produced between the capstan motor 1 and the reel is prevented, and by applying the braking force to the take-up reel mount 8 the upward or downward shift of the tape at the pinching area of the capstan and the pinch roller is suppressed to stabilize the tape transport. Furthermore, by releasing the tension arm 10, the brake to the supply reel mount 9 is released to reduce a load torque to the reel motor 14. By retracting the tension pin 10, hunting of the tension arm 18 which would otherwise be apt to take place in the fast reverse tape transport is prevented.

(c) Stop

The stop operation in the modes (a) and (b) is now explained. When a stop button is depressed in the mode (a) or (b), the electromagnet 45 is released and the pinch roller arm 43 pivots clockwise by the force of the tension arm 54 and is restricted in position by the stopper 52. The pinch roller 2 releases the contact to the capstan 1a so that the drive of the magnetic tape 4a is stopped. At this time, the take-up arm 50 is slid in the direction of the arrow A in FIG. 8 against the biasing force of the return spring 51 so that the contact of the take-up roll 7 to the reel mount 8 and the contact of the flywheel 1b of the capstan motor 1 to the take-up idler 7 are released. At the same time, the electromagnet 65 is actuated to pivot the tension arm 18 in the same manner as in the loading operation so that the tension pin 10 is retracted and the brake to the reel mount 9 is released while the brake is applied to the take-up reel mount 8. Then the guide roll bases 27 and 28 are retracted by a conventional unloading mechanism (not shown) and the reel motor 14 is driven counterclockwise to drive the supply reel mount 9 counterclockwise through the FR idler 12. As a result, the magnetic tape 4a pulled out of the cassette 4 is taken up as the guide roll bases 27 and 28 retract. When the guide roll bases 27 and 28 reach the start end of the arcuate groove on the sub-chassis 15 as shown in FIG. 2, the limiter mechanism operates to terminate the unloading operation. At the same time the attraction by the electromagnet 65 is also released to return to the position shown in FIG. 5. As the guide roll bases retract from the position shown in FIG. 7, the tension arm 18 is pushed by the end 27a of the guide roll base 27 and at the end of the unloading operation the tension pin 10 together with the guide rolls 21 and 24 and the slant pins 22 and 23 are held in the position to permit the entry into the cassette 4. As described above, in the unloading operation the supply reel mount 9 takes up the tape while the braking force is imparted to the take-up reel mount 8, and in the loading operation the tape is always pulled out of the supply reel mount 9. Accordingly, even if the record or playback operation is carried out while repeating the loading and unloading operations, the tape can be contiguously used. In other words, the recorded areas are not overlapped nor are non-recorded areas produced.

Figure 12:
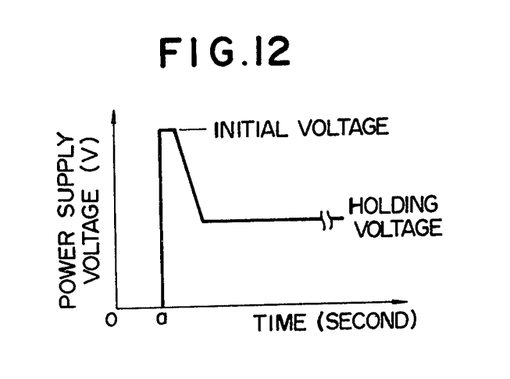
FIG. 12 shows a graph illustrating a power supply voltage applied to the electromagnet used in the embodiment of FIG. 1.

As described above, since the electromagnet 65 drives the tension arm 18. The take-up idler 6 and the clutch lever 60, a relatively large power is required. Since a large power is required at the starting time, a relatively large starting voltage as shown in FIG. 12 is applied. However, since the electromagnet 65 may be overheated if such a large voltage remains applied, the voltage is reduced after the plunger 67 has been fully attracted and a relatively low holding voltage is applied. A characteristic of a plunger stroke of the electromagnet versus attraction force is shown in FIG. 11. Although the plunger 67 can be held once it has been fully attracted, it may not be fully attracted even by the starting voltage if a large load is applied to the electromagnet 65 at the starting time, for example by the ride of the tip end of the pawl 60a on the tip end of the ratchet 55a. Since the voltage is then reduced to the holding voltage resulting in the reduction of the attraction force, the intended operation is not achieved and a malfunction condition will takes place. In order to prevent such a malfunction, the spring 75 is provided as explained above. By the provision of the spring 75, the plunger 67 of the electromagnet 65 can move to the predetermined attracted position against the force of the spring 75 even if the pawl 60a rides on the ratchet 55a, that is a sufficient force is obtained to achieve the intended operation.

As described above, according to the present invention, the switching mechanism for the forward and reverse tape transports is attained by the single electromagnet and remotely controlled by an inexpensive and simple construction. In the reverse tape transport, by selecting an appropriate amount of braking force to the supply reel mount in the reverse tape transport and completely releasing the braking force applying mechanism for the take-up reel mount, a stable reverse tape transport is attained. By activating the present mechanism in the tape loading and unloading operations, the shift of the tape position is prevented, and by suppressing the actuation of the braking force applying mechanism for the supply reel mount in the forward tape transport in the loading operation until the tape loading operation completes, the tape load in the loading operation to the take pull-out members can be minimized and the positioning of the tension arm (tension pin) by the retraction of the tape pull-out members in the unloading operation is facilitated.

What is claimed is:

1. A magnetic recording and reproducing apparatus having an idler mechanism, for rotating a first and second reel mounts with a predetermined torque to pull out a magnetic tape extending between a first reel and a second reel into a predetermined tape path and take up a magnetic tape pinched and driven by a capstan and a pinch roller onto said first reel mount, first braking force applying means for applying a predetermined braking force to said second reel mount and a second braking force applying means for applying a predetermined braking force to said first reel mount, comprising a single electromagnet operatively coupled to said idler mechanism and said first and second braking force applying means such that when a plunger of said electromagnet is at a first position the drive of said reel mounts by said idler mechanism and the brake of said first braking force applying means are released while the brake to said first reel mount by said second braking force applying means is enabled, and when said plunger of said electromagnet is in a second position the drive of said reel mount by said idler mechanism and the brake by said first braking force applying means are enabled while the brake by said second braking force applying means is released.

2. A magnetic recording and reproducing apparatus according to claim 1 wherein said plunger of said electromagnet is held in a first position when said magnetic tape is transported reversely while a magnetic tape is loaded in said predetermined tape path and held in said second position when a magnetic tape is transported forwardly.

3. A magnetic recording and reproducing apparatus according to claim 1 wherein said plunger of said electromagnet is held in said first position during a loading operation for loading a magnetic tape to said predetermined tape path and an unloading operation for unloading a magnetic tape into a cassette, and said second reel mount is imparted with a predetermined rotation torque during said unloading operation to take-up a magnetic tape.

4. A magnetic recording and reproducing apparatus according to claim 1 wherein said second braking force applying means includes brake means mounted on said first reel mount, engaging means for actuating said brake means when said plunger of said electromagnet is at said first position, transmission means for transmitting the displacement of said plunger of said electromagnet and a spring spanned between said engaging means and said transmission means, said transmission means being responsive to the attraction of said electromagnet to displace against a force of said spring when said engagement means does not properly engage so that said engagement means properly engages by the tension of said spring after said electromagnet has assumed a holding status.

* * * * *